(12) United States Patent
Shin et al.

(10) Patent No.: US 9,576,740 B2
(45) Date of Patent: Feb. 21, 2017

(54) TANTALUM CAPACITOR

(71) Applicant: SAMSUNG ELECTRO-MECHANICS CO., LTD., Suwon-Si, Gyeonggi-Do (KR)

(72) Inventors: Hong Kyu Shin, Suwon-Si (KR); Jae Bum Cho, Suwon-Si (KR); Jae Hyuk Choi, Suwon-Si (KR); Wan Suk Yang, Suwon-Si (KR); Hyoung Sun Ham, Suwon-Si (KR); Hyun Sub Oh, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 183 days.

(21) Appl. No.: 14/508,583

(22) Filed: Oct. 7, 2014

(65) Prior Publication Data
US 2016/0012970 A1    Jan. 14, 2016

(30) Foreign Application Priority Data

Jul. 11, 2014 (KR) .................. 10-2014-0087519

(51) Int. Cl.
*H01G 9/08* (2006.01)
*H01G 9/008* (2006.01)
*H01G 9/052* (2006.01)

(52) U.S. Cl.
CPC .............. *H01G 9/008* (2013.01); *H01G 9/052* (2013.01); *H01G 9/08* (2013.01)

(58) Field of Classification Search
None
See application file for complete search history.

(56) References Cited

U.S. PATENT DOCUMENTS

| 5,184,287 | A | * | 2/1993 | Taniguchi | H01G 9/012 361/540 |
|---|---|---|---|---|---|
| 5,560,761 | A | * | 10/1996 | Naito | C22C 1/045 204/292 |
| 5,638,253 | A | * | 6/1997 | Hasegawa | H01G 9/012 361/523 |
| 7,646,589 | B2 | * | 1/2010 | Kuriyama | H01G 9/012 361/523 |
| 2003/0223180 | A1 | * | 12/2003 | Aoyama | H01G 2/065 361/523 |
| 2005/0207090 | A1 | * | 9/2005 | Kuriyama | H01G 9/012 361/271 |

(Continued)

FOREIGN PATENT DOCUMENTS

JP    2008-187091 A    8/2008
WO    03-107365 A1    12/2003

*Primary Examiner* — Dion R Ferguson
(74) *Attorney, Agent, or Firm* — McDermott Will & Emery LLP (57) ABSTRACT

A tantalum capacitor may include two tantalum wires exposed through two surfaces of a capacitor body opposing each other, first and second positive electrode terminals, connected to the tantalum wires, respectively, and disposed on two surfaces of a molded part opposing each other, and a negative electrode terminal disposed between the first and second positive electrode terminals. The negative electrode terminal may be electrically connected to the capacitor body by a via electrode or a pad electrode disposed between the negative electrode terminal and the capacitor body.

13 Claims, 9 Drawing Sheets

(56) References Cited

U.S. PATENT DOCUMENTS

| | | | |
|---|---|---|---|
| 2006/0109609 A1 | 5/2006 | Kobayashi et al. | |
| 2006/0285276 A1* | 12/2006 | Kuriyama | H01G 9/14 361/523 |
| 2007/0159770 A1* | 7/2007 | Kuriyama | H01G 2/065 361/528 |
| 2007/0177336 A1* | 8/2007 | Kuriyama | H01G 9/012 361/523 |
| 2009/0073638 A1* | 3/2009 | Fujii | H01G 2/06 361/523 |

* cited by examiner

TANTALUM CAPACITOR

CROSS-REFERENCE TO RELATED APPLICATION

This application claims the benefit of Korean Patent Application No. 10-2014-0087519 filed on Jul. 11, 2014, with the Korean Intellectual Property Office, the disclosure of which is incorporated herein by reference.

BACKGROUND

The present disclosure relates to a tantalum capacitor.

Tantalum (Ta) is a metal widely used in various industrial sectors such as aerospace and defense sectors, and the like, as well as in the fields of electrical, electronic, mechanical, and chemical sectors due to mechanical and physical properties thereof such as a high melting point, excellent flexibility, and high corrosion-resistance, and the like.

Since tantalum may form a stable anodic oxide film, it has been widely used as a material for miniaturized capacitors. Recently, in accordance with rapid development of an information technology (IT)-related industries such as the electronics and info-communications sectors, tantalum has been increasingly used on a year-on-year basis.

A capacitor generally indicates a condenser temporally storing electricity therein. For example, a capacitor, a component accumulating electricity by allowing two flat plate electrodes insulated from each other to approach each other, inserting a dielectric between the both electrodes, and creating an electrical charge with electricity by attractive force, may be used to obtain capacitance by confining electrical charges and an electric field in a space enclosed by two conductors.

A tantalum capacitor formed of the tantalum material uses voids created when tantalum powder particles are sintered and solidified.

For example, the tantalum capacitor may be completed by forming tantalum oxide ($Ta_2O_5$) on a surface of a tantalum particle using an anodic oxidation method, forming a manganese dioxide ($MnO_2$) layer, an electrolyte, on the tantalum oxide as a dielectric material, forming a carbon layer and a metal layer on the manganese dioxide layer to form a body, and electrically connecting positive and negative electrode terminals to the body and forming a molded part so as to allow the tantalum capacitor to be mounted on a printed circuit board (PCB).

Recently, as high functional electronic products such as smart phones have been released, a capacitor drivable in a high frequency band has been demanded. However, a general tantalum capacitor does not satisfy this demand.

In addition, equivalent series inductance (ESL) in the tantalum capacitor refers to parasitic inductance in a circuit. A reduction in ESL of the tantalum capacitor may be a very important factor in terms of designing a PCB power unit.

RELATED ART DOCUMENT

Patent Document (Patent Document 1) Japanese Patent Laid-Open Publication No. 2008-187091

SUMMARY

An exemplary embodiment in the present disclosure may provide a tantalum capacitor having a reduced equivalent series inductance (ESL).

According to an exemplary embodiment in the present disclosure, a tantalum capacitor in which two tantalum wires are exposed through two surfaces of a capacitor body, opposing each other, first and second positive electrode terminals connected to the tantalum wires, respectively, are disposed on two surfaces of a molded part opposing each other, a negative electrode terminal is disposed between the first and second positive electrode terminals, and the negative electrode terminal is electrically connected to the capacitor body by an electrical connection unit disposed between the negative electrode terminal and the capacitor body may be provided.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
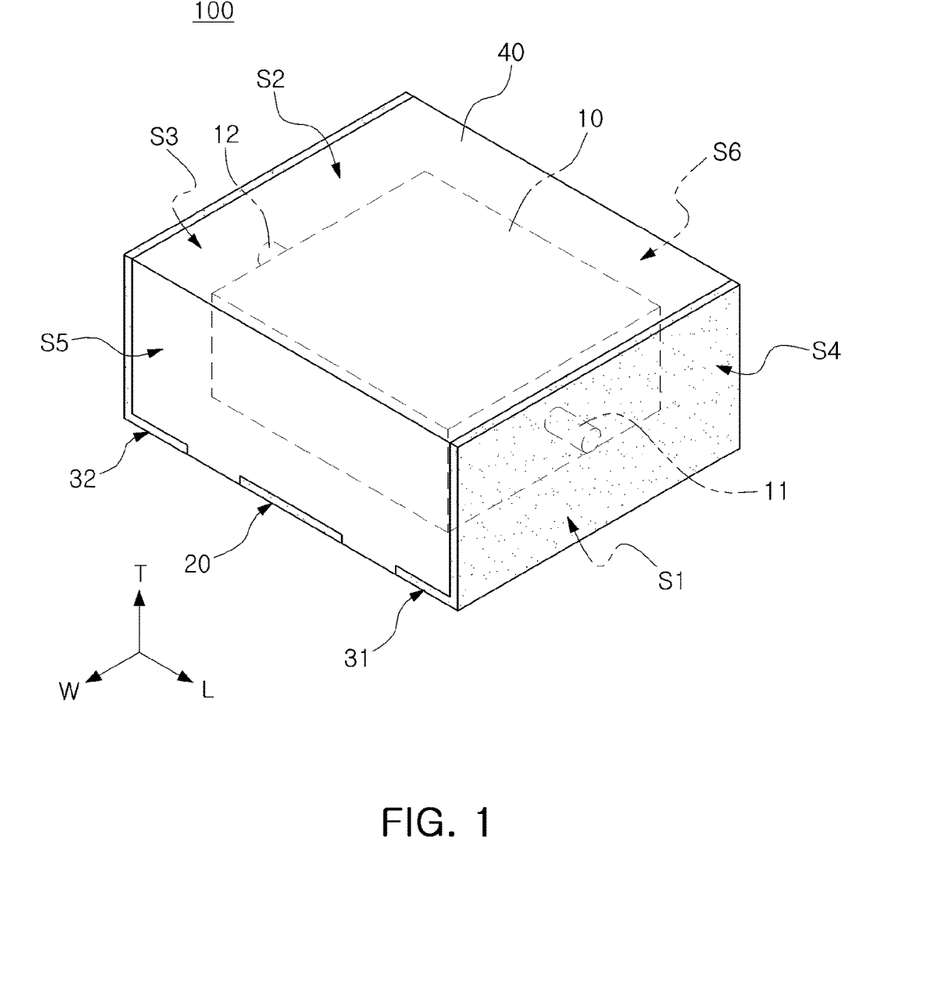
FIG. 1 is a schematic transparent perspective view of a tantalum capacitor according to an exemplary embodiment in the present disclosure.
Figure 2:
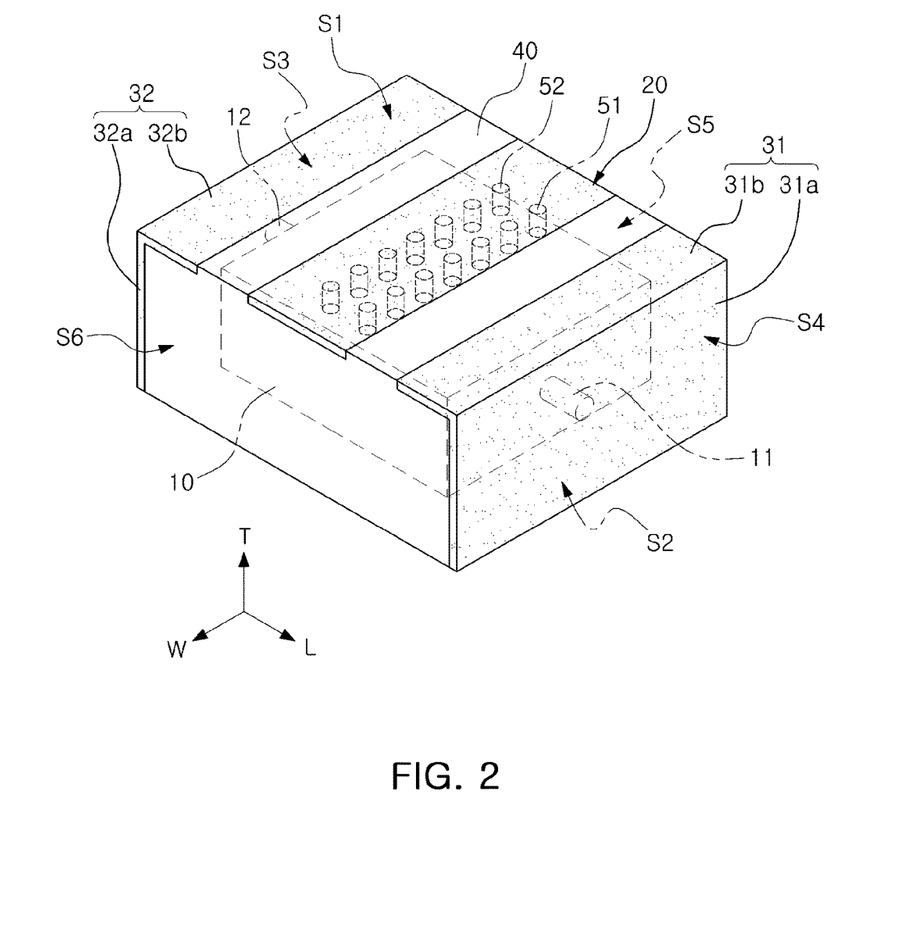
FIG. 2 is a schematic transparent perspective view of the tantalum capacitor of FIG. 1, in which a bottom of the tantalum capacitor is viewed.

FIG. 1 is a schematic transparent perspective view of a tantalum capacitor according to an exemplary embodiment in the present disclosure. FIG. 2 is a schematic transparent perspective view of the tantalum capacitor of FIG. 1, in which a bottom of the tantalum capacitor is viewed.

Referring to FIGS. 1 and 2, a tantalum capacitor 100 according to the exemplary embodiment may include a capacitor body 10 having first and second tantalum wires 11 and 12; a molded part 40; first and second positive electrode terminals 31 and 32; a negative electrode terminal 20; and an electrical connection unit connecting the capacitor body 10 and the negative electrode terminal 20 to each other.

Hereinafter, in the exemplary embodiment, for the convenience of explanation, a mounting surface of the molded part 40 is defined as a bottom surface S1, a surface opposite to the bottom surface S1 in a thickness direction is defined as a top surface S2, both surfaces of the molded part 40 in a length direction are defined as first and second end surfaces S3 and S4, and both side surfaces of the molded part 40 perpendicularly intersecting with the first and second end surfaces S3 and S4 and opposing each other in a width direction are defined as first and second side surfaces S5 and S6.

The capacitor body 10 may contain a tantalum powder and serve as a negative electrode of the capacitor.

The capacitor body 10 according to the exemplary embodiment may have the first and second tantalum wires 11 and 12 respectively exposed through both end surfaces of the capacitor body 10 opposing each other in the length direction.

The capacitor body 10 may be formed of a porous valve-acting metal body and may be manufactured by sequentially forming a dielectric layer, a solid electrolyte layer, and a negative electrode layer on a surface of the porous valve-acting metal body.

For example, the capacitor body 10 may be manufactured by mixing a tantalum powder and a binder at a predetermined ratio, stirring and compressing the mixture to form a rectangular parallelepiped body, and then sintering the formed rectangular parallelepiped body at a high temperature under high vacuum atmosphere.

In more detail, a tantalum capacitor uses voids created when tantalum powder particles are sintered and solidified. The capacitor body 10 may be manufactured by forming tantalum oxide ($Ta_2O_5$) on a surface of a tantalum particle using an anodic oxidation method, forming a manganese dioxide ($MnO_2$) layer, an electrolyte, or a conductive polymer layer on the tantalum oxide as a dielectric material, and then, forming a carbon layer and a metal layer on the manganese dioxide layer or the conductive polymer layer.

In addition, carbon and silver (Ag) may be coated on a surface of the capacitor body 10, if necessary.

The carbon may be provided to decrease contact resistance in the surface of the capacitor body 10, and the silver (Ag) may be provided to improve electric connectivity when the capacitor body 10 is electrically connected to the negative electrode terminal 20 through the electrical connection unit.

The first and second tantalum wires 11 and 12 may serve as a positive electrode of the capacitor.

The first and second tantalum wires 11 and 12 may include first and second insertion regions respectively disposed within the capacitor body 10, and first and second non-insertion regions extended from the first and second insertion regions to be exposed through both end surfaces of the capacitor body 10 opposing each other, respectively.

The first and second tantalum wires 11 and 12 according to the exemplary embodiment may be configured to be exposed through both end surfaces of the capacitor body 10 in the length direction, respectively, but the present disclosure is not limited thereto.

For example, the first and second tantalum wires 11 and 12 according to an exemplary embodiment in the present disclosure may be configured to be exposed through both side surfaces of the capacitor body 10 in the width direction, respectively, if necessary. In this case, the first and second positive electrode terminals may be formed on first and second side surfaces S5 and S6 of the molded part 40 in the width direction so as to correspond to the first and second tantalum wires 11 and 12.

In addition, the first and second tantalum wires 11 and 12 may be inserted and mounted into the mixture of the tantalum powder and the binder, prior to the compressing of the mixed particles of the tantalum powder and the binder.

That is, the capacitor body 10 may be manufactured by inserting the tantalum wires 11 and 12 into the tantalum powder mixed with the binder to form a tantalum element having a desired size and then sintering the tantalum element at about 1,000 to 2,000° C. under high vacuum atmosphere ($10^{-5}$ torr or less) for about 30 minutes.

In this case, the first and second tantalum wires 11 and 12 may be collinearly disposed in the length direction of the capacitor body 10.

The molded part 40 may be formed by transfer-molding an insulating resin such as an epoxy molding compound (EMC), or the like, so as to enclose the capacitor body 10 and the first and second non-insertion regions of the first and second tantalum wires 11 and 12.

In this case, the molded part 40 may be formed such that end portions of the first and second non-insertion regions of the first and second tantalum wires 11 and 12 are exposed through the first and second end surfaces S3 and S4 of the molded part 40 opposing each other in the length direction, respectively.

The molded part 40 may not only serve to protect the first and second tantalum wires 11 and 12 and the capacitor body 10 from the outside, but also serve to insulate the capacitor body 10 and the first and second positive electrode terminals 31 and 32 from each other.

The first and second positive electrode terminals 31 and 32 may be disposed on both end portions of the molded part 40 in the length direction.

The first and second positive electrode terminals 31 and 32 may include first and second wire connection parts 31a and 32a formed on the first and second end surfaces S3 and S4 of the molded part 40 to be exposed through the first and second end surfaces S3 and S4 of the molded part 40, respectively, and contacting the end portions of the first and second non-insertion regions of the first and second tantalum wires 11 and 12 to be electrically connected thereto; and first and second positive terminal parts 31b and 32b respectively bent from the first and second wire connection parts 31a and 32a to be partially extended to the bottom surface S1 of the molded part 40 and disposed to be spaced apart from each other.

In addition, a conductive adhesive layer may be further formed between the first or second wire connection part 31a or 32a of the first or second positive electrode terminal 31 or 32 and the first or second non-insertion region of the first or second tantalum wire 11 or 12, in such a manner that the first or second wire connection part 31a or 32a of the first or second positive electrode terminal 31 or 32 and the end portion of the first or second non-insertion region of the first or second tantalum wire 11 or 12 are bonded to each other.

In this case, the conductive adhesive layer may be formed, for example, by a dispensing method using a predetermined amount of a conductive adhesive containing an epoxy-based thermosetting resin and a metal powder or by a dotting method using the conductive adhesive, but the present disclosure is not limited thereto.

However, the present disclosure is not limited thereto.

The negative electrode terminal 20 may be disposed on the bottom surface of the molded part 40 such that a bottom surface thereof is exposed outwardly. The negative electrode terminal 20 may be spaced apart from the first and second positive terminal parts 31*b* and 32*b* of the first and second positive terminals 31 and 32, respectively.

The negative electrode terminal 20 may be electrically connected to the capacitor body 10 by the electrical connection unit disposed between the capacitor body 10 and the negative electrode terminal 20.

In this case, the negative electrode terminal 20 may be extended to portions of the first and second side surfaces S5 and S6 of the molded part 40 in the width direction, if necessary. In this case, since an area of the negative electrode terminal 20 may be further increased, an ESR value may be decreased.

The electrical connection unit may be a plurality of via electrodes 51 and 52 disposed to be spaced apart from each other.

Each of the via electrodes 51 and 52 may be formed in the molded part 40 in the thickness direction thereof between the bottom surface of the capacitor body 10 and a top surface of the negative electrode terminal 20, and may have both ends connected to the bottom surface of the capacitor body 10 and the top surface of the negative electrode terminal 20 to electrically connect the capacitor body 10 and the negative electrode terminal 20 to each other.

According to the exemplary embodiment, for example, the molded part 40 may have a length of 2.30 mm at a maximum and a width of 1.50 mm at a maximum. In this case, distances of the first and second positive terminal parts 31*b* and 32*b*, in the length direction, of the first and second positive terminals 31 and 32 exposed through the mounting surface of the molded part 40 may be 0.45 to 0.55 mm, respectively. In addition, a distance of the negative electrode terminal 20 in the length direction exposed through the mounting surface of the molded part 40 may be 0.65 to 0.75 mm. In addition, a distance between the first or second positive terminal part 31*b* or 32*b* and either side surface of the negative electrode terminal 20, adjacent to the positive terminal part, may be 0.275 to 0.325 mm.

In the exemplary embodiment, in a case in which the distance between the first or second positive terminal part 31*b* or 32*b* and either side surface of the negative electrode terminal 20, adjacent to the positive terminal part, exceeds 0.325 mm, the ESL may be increased, and in a case in which the distance between the first or second positive terminal part 31*b* or 32*b* and either side surface of the negative electrode terminal 20, adjacent to the positive terminal part, is below 0.275 mm, a positive electrode and a negative electrode may be connected to each other when being mounted on a substrate, such that a short circuit may occur.

Figure 3:
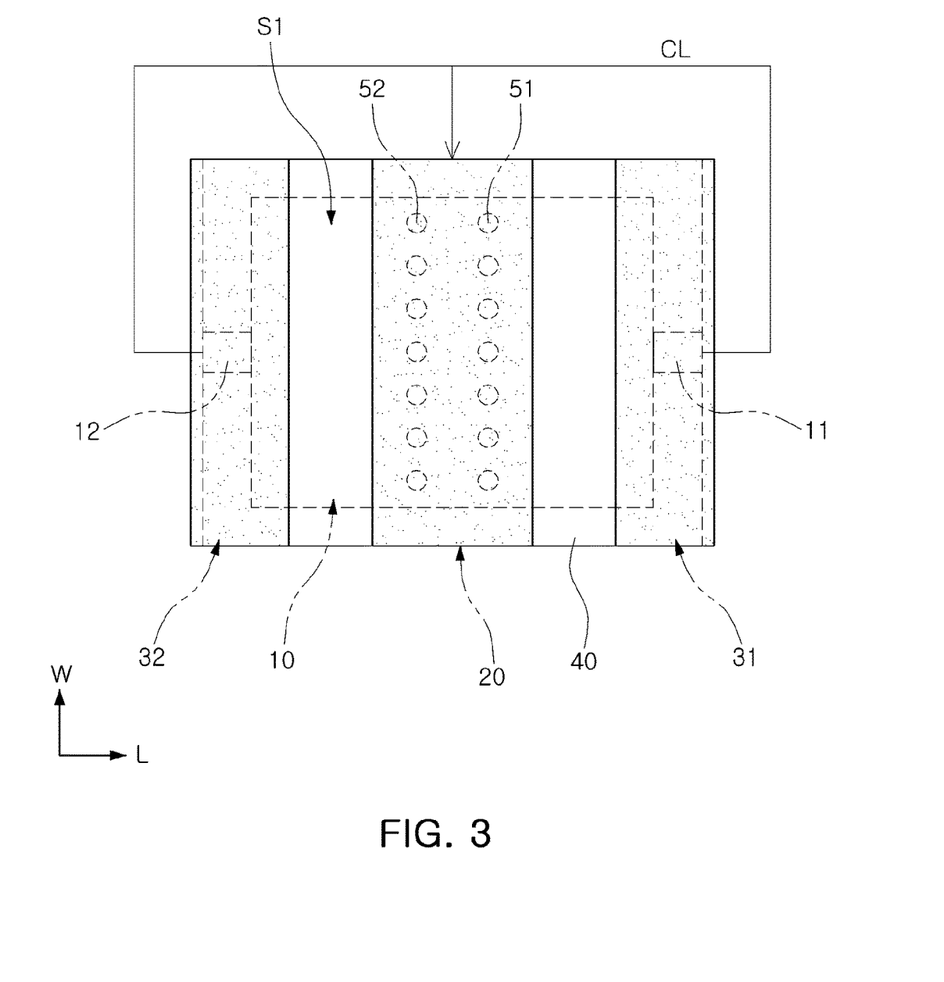
FIG. 3 is a bottom view of the tantalum capacitor of FIG. 1.
Figure 4:
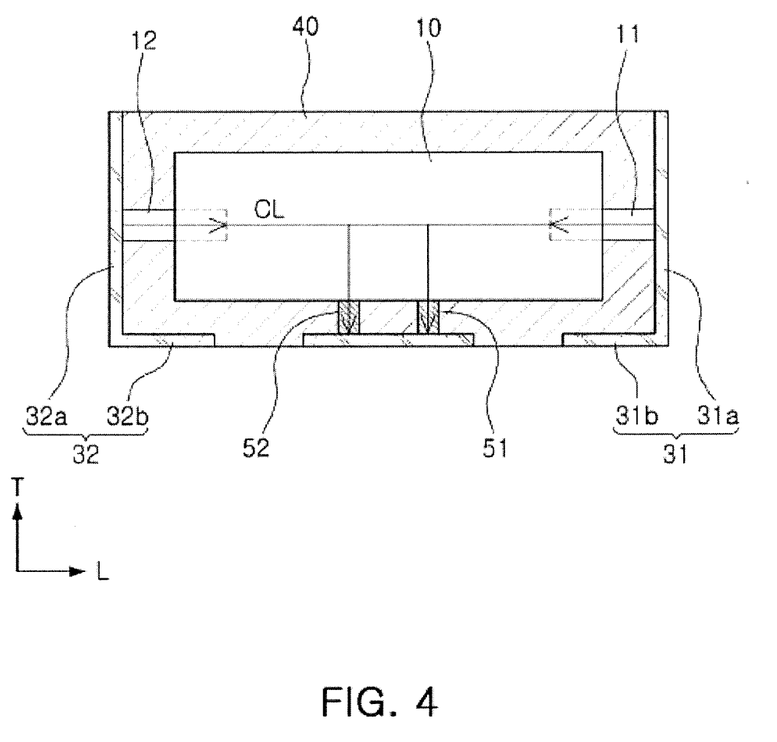
FIG. 4 is a cross-sectional view of the tantalum capacitor of FIG. 1, cut in a length-thickness direction.

FIG. 3 is a bottom view of the tantalum capacitor of FIG. 1. FIG. 4 is a cross-sectional view of the tantalum capacitor of FIG. 1, cut in a length-thickness direction.

Referring to FIGS. 3 and 4, according to the exemplary embodiment, the negative electrode terminal 20 may be disposed between the first and second positive electrode terminals 31 and 32 so as to be adjacent thereto on the bottom surface S1, the mounting surface of the molded part 40.

Therefore, a length of a current loop (CL) connected from the first and second wire connection parts 31*a* and 32*a* of the first and second positive electrode terminals 31 and 32 disposed on the first and second end surfaces S3 and S4 of the molded part 40 in the length direction to the negative electrode terminal 20 through the first and second tantalum wires 11 and 12 and the capacitor body 10 may be significantly decreased. Thus, the ESL value controlling high frequency characteristics of the tantalum capacitor 100 may be decreased.

In addition, mutual inductance may be provided between the negative electrode terminal 20 and the first and second positive electrode terminals 31 and 32 that are disposed to be adjacent to each other. Therefore, the ESL value may be further decreased by a cancellation effect of a high-frequency current.

Figure 5:
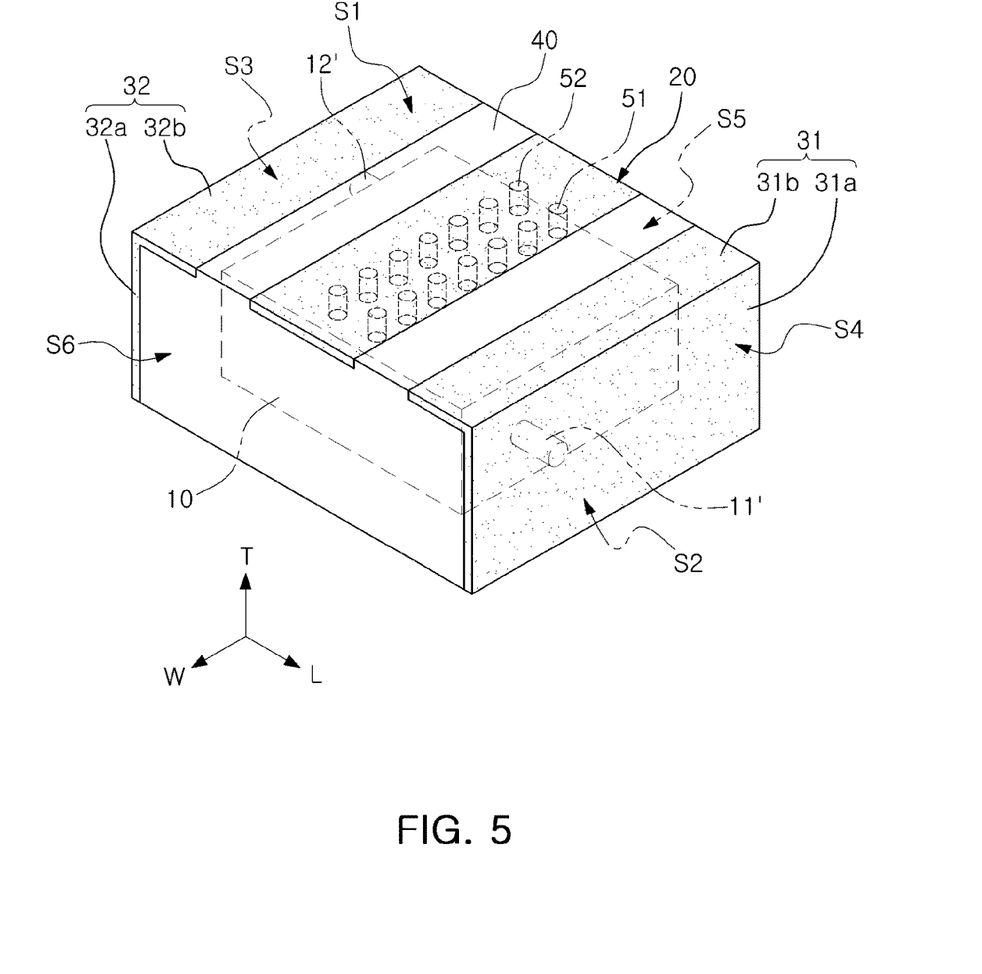
FIG. 5 is a transparent perspective view of a tantalum capacitor according to another exemplary embodiment in the present disclosure, in which a bottom of the tantalum capacitor is viewed in order to illustrate another example of tantalum wires.
Figure 6:
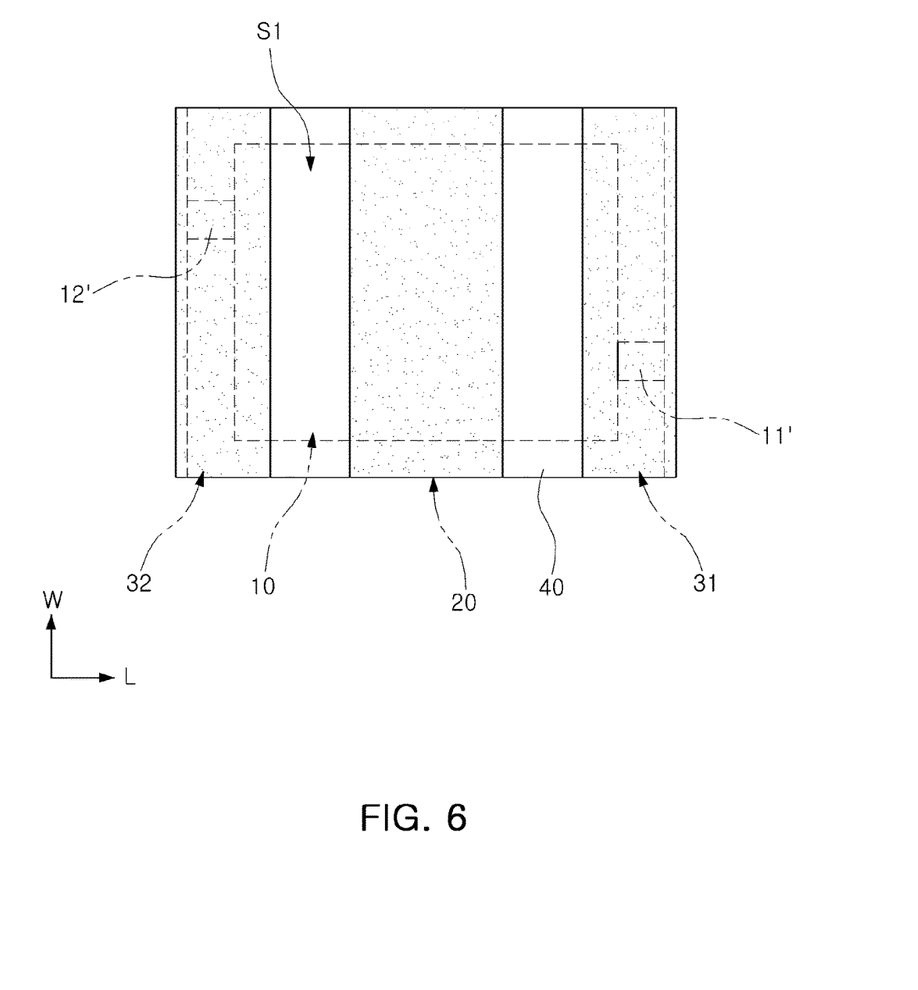
FIG. 6 is a bottom view of the tantalum capacitor of FIG. 5.

FIG. 5 is a transparent perspective view of a tantalum capacitor according to another exemplary embodiment in the present disclosure, in which a bottom of the tantalum capacitor is viewed in order to illustrate another example of tantalum wires. FIG. 6 is a bottom view of the tantalum capacitor of FIG. 5.

Referring to FIGS. 5 and 6, as a further example of the tantalum wires, first and second tantalum wires 11' and 12' of the tantalum capacitor may be disposed in positions not coinciding with each other in the width direction of the capacitor body 10, that is, disposed to be offset from each other in the width direction of the capacitor body 10.

For example, the first and second tantalum wires 11' and 12' may be disposed at positions opposing each other in a diagonal direction in a cross-section of the capacitor body 10 in a length-width direction. The first and second tantalum wires 11' and 12' may be connected to the first and second wire connection parts 32*a* and 32*b* of the first and second positive electrode terminals 31 and 32, respectively.

As described above, in a case in which the first and second tantalum wires 11' and 12' are disposed so as not to coincide with each other in the width direction of the capacitor body 10, the wires may be inserted into the capacitor body 10 in balance at the time of forming the capacitor body 10, whereby workability may be improved.

Here, since structures of the molded part 40, the first and second positive electrode terminals 31 and 32, and the negative electrode terminal 20 according to another exemplary embodiment in the present disclosure are similar to those of the molded part 40, the first and second positive electrode terminals 31 and 32, and the negative electrode terminal 20 of the foregoing exemplary embodiment in the present disclosure as described above, a detailed description thereof will be omitted in order to avoid an overlapped description.

Figure 7:
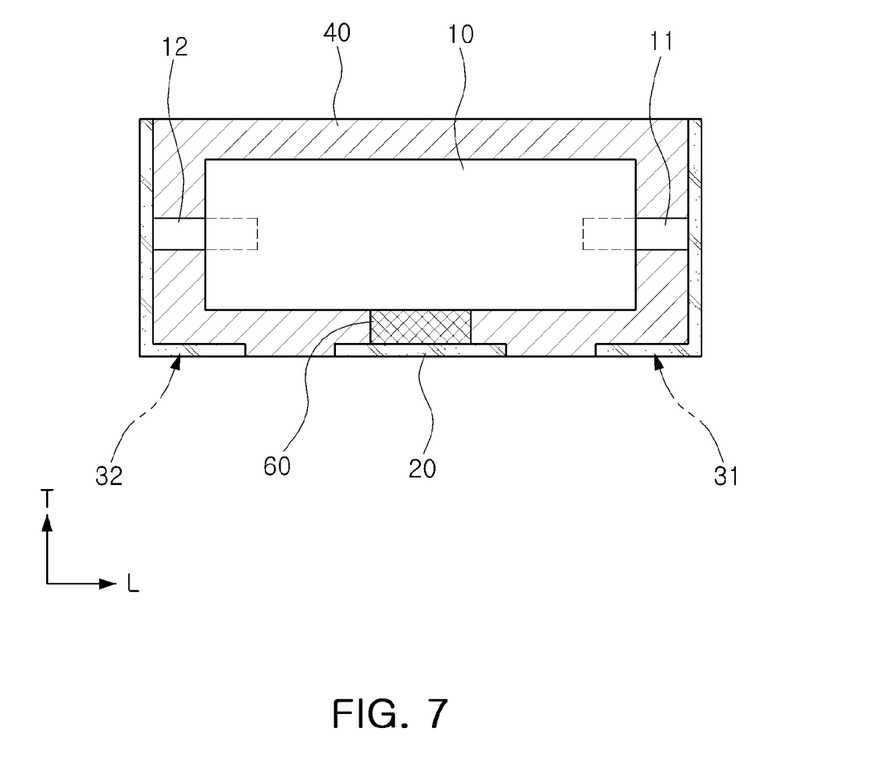
FIG. 7 is a cross-sectional view of the tantalum capacitor of FIG. 5 cut in a length-thickness direction in order to illustrate another example of an electrical connection unit according to an exemplary embodiment in the present disclosure.

FIG. 7 is a cross-sectional view of the tantalum capacitor of FIG. 5 cut in a length-thickness direction in order to illustrate another example of an electrical connection unit according to an exemplary embodiment in the present disclosure.

Referring to FIG. 7, an electrical connection unit of the tantalum capacitor may be a pad electrode 60.

The pad electrode 60 may be disposed between the bottom surface of the capacitor body 10 and the top surface of the negative electrode terminal 20, a top surface thereof may be connected to the bottom surface of the capacitor body 10, and a bottom surface thereof may be connected to the top surface of the negative electrode terminal 20, such that the capacitor body 10 and the negative electrode terminal 20 may be electrically connected to each other.

Here, since structures of the molded part 40, the first and second positive electrode terminals 31 and 32, and the negative electrode terminal 20 are similar to those of the molded part 40, the first and second positive electrode terminals 31 and 32, and the negative electrode terminal 20 of the foregoing exemplary embodiment in the present disclosure as described above, a detailed description thereof will be omitted in order to avoid an overlapped description.

Figure 8:
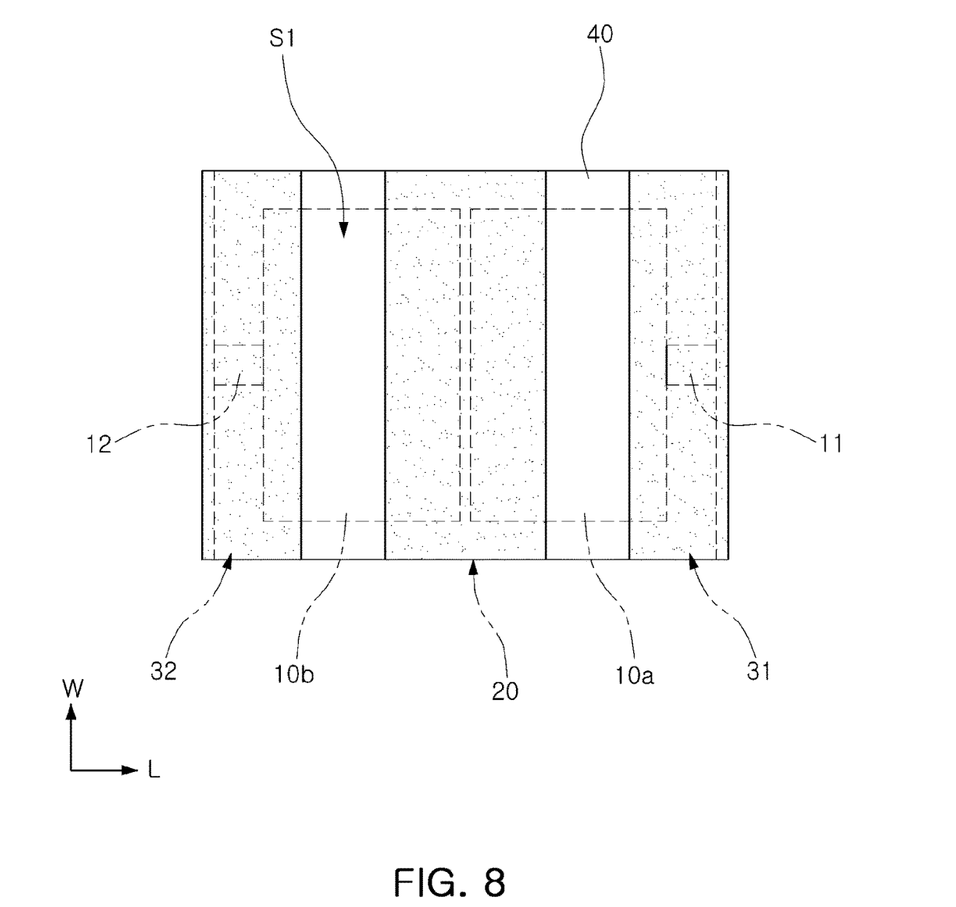
FIG. 8 is a bottom view of a tantalum capacitor according to another exemplary embodiment in the present disclosure.

FIG. 8 is a bottom view of a tantalum capacitor according to another exemplary embodiment in the present disclosure.

Here, since structures of the molded part 40, the first and second positive electrode terminals 31 and 32, and the electrical connection unit according to another exemplary embodiment in the present disclosure are similar to those of the molded part 40, the first and second positive electrode terminals 31 and 32, and the electrical connection unit of the foregoing exemplary embodiment in the present disclosure as described above, a detailed description thereof will be omitted in order to avoid an overlapped description.

Referring to FIG. 8, the tantalum capacitor according to another exemplary embodiment may include first and second capacitor bodies 10a and 10b.

In this case, the first and second capacitor bodies 10a and 10b may be configured to implement the same level of capacity by forming a size and a material thereof to be the same as each other, or may be configured to implement different levels of capacity by forming the size or the material thereof to be different from each other, if necessary.

The first and second capacitor bodies 10a and 10b according to the exemplary embodiment may have other side surfaces disposed to face each other in the length direction, so that the first and second tantalum wires 11 and 12 are exposed through respective one side surfaces of the first and second capacitor bodies 10a and 10b opposing each other in the length direction.

In this case, the first and second tantalum wires 11 and 12 may be collinearly disposed in the length direction of the molded part 40. However, the present disclosure is not limited thereto. For example, the first and second tantalum wires 11 and 12 may be disposed so as not to coincide with each other in the width direction of the first and second capacitor bodies 10a and 10b.

In addition, the first and second tantalum wires 11 and 12 may include first and second insertion regions disposed within the first and second capacitor bodies 10a and 10b, respectively, and first and second non-insertion regions extended from the first and second insertion regions to be exposed through the respective one side surface of the first and second capacitor bodies 10a and 10b in the length direction.

The negative electrode terminal 20 may be disposed such that the bottom surface of the molded part 40 is outwardly exposed. In addition, the negative electrode terminal 20 may have both side surfaces spaced apart from the first and second positive terminal parts 31b and 32b of the first and second positive terminals 31 and 32, respectively, in the length direction.

The negative electrode terminal 20 may be connected to the first and second capacitor bodies 10a and 10b by the electrical connection unit disposed between the first and second capacitor bodies 10a and 10b and the negative electrode terminal 20, such that the negative electrode terminal 20 may be electrically connected to the first and second capacitor bodies 10a and 10b at the same time.

As described above, in a case in which the capacitor body is divided into the first and second capacitor bodies 10a and 10b, a positive electrode portion of the tantalum capacitor 100 is divided into two portions. Therefore, a cross-sectional area in which the tantalum wire and the capacitor body are in contact with each other may be increased, such that ESR may be generally decreased by half the level thereof.

Figure 9:
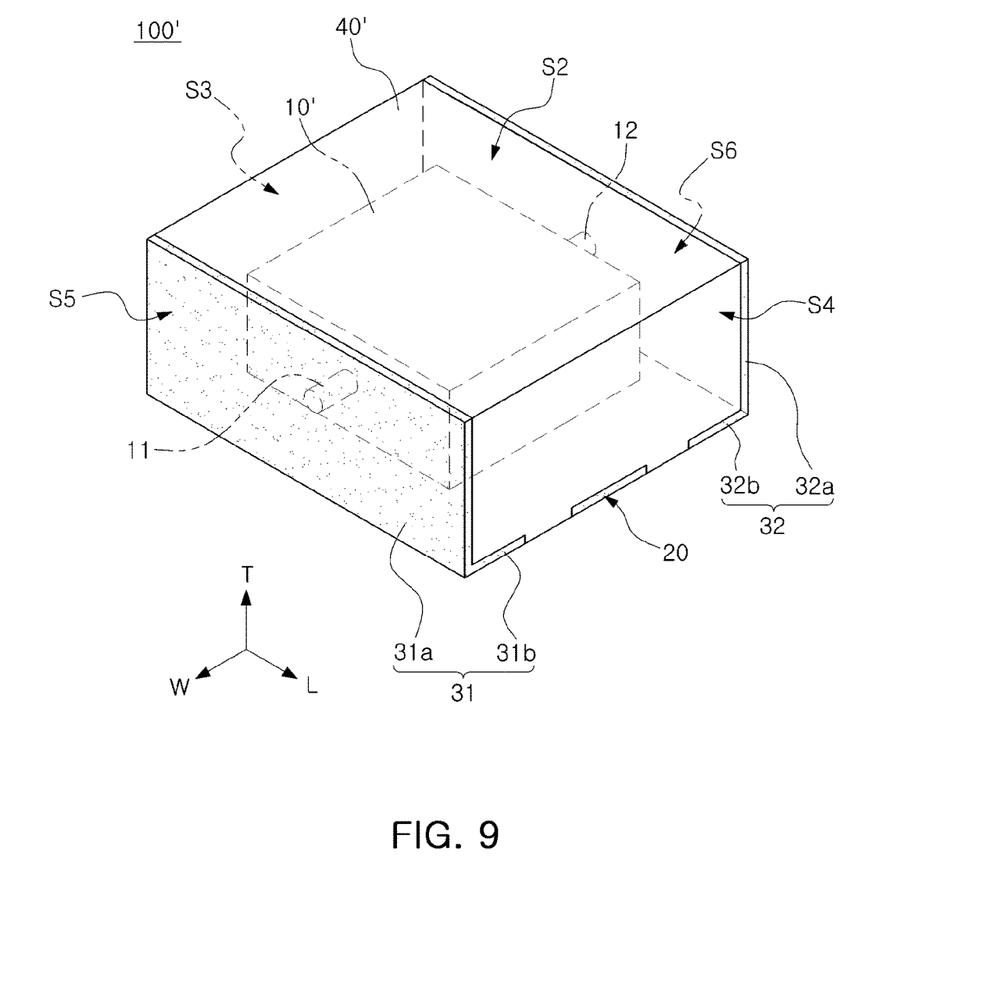
FIG. 9 is a perspective view of a tantalum capacitor according to another exemplary embodiment in the present disclosure.

FIG. 9 is a perspective view of a tantalum capacitor according to another exemplary embodiment in the present disclosure.

Referring to FIG. 9, a tantalum capacitor 100' according to another exemplary embodiment may be formed such that the first and second tantalum wires 11 and 12 may be respectively exposed to both side surfaces of a capacitor body 10' opposing each other in the width direction and may be exposed through first and second side surfaces S5 and S6 of a molded part 40', respectively.

In addition, the first and second wire connection parts 31a and 32a of the first and second positive terminals 31 and 32 may be disposed on the first and second side surfaces S5 and S6 of the molded part 40' in the width direction and may be respectively connected to the exposed portions of the first and second tantalum wires 11 and 12 to be thereby electrically connected thereto.

In this case, the negative electrode terminal 20 may be formed in the width direction of the molded part 40' so as to be spaced apart from the first and second positive electrode terminal parts 31b and 32b of the first and second positive terminals 31 and 32 on the bottom surface S2 of the molded part 40'.

In the tantalum capacitor 100' having the above-mentioned structure, distances between the first and second positive electrode terminals 31 and 32 and the negative electrode terminal 20 may be further decreased to thereby further reduce the length of the current loop, the ESL value of the tantalum capacitor 100' in a high frequency band may be further decreased as compared to that of the above-mentioned exemplary embodiments.

As set forth above, according to exemplary embodiments in the present disclosure, the length of the current loop connected between the positive electrode terminal and the negative electrode terminal may be significantly decreased, whereby equivalent series inductance (ESL) and electrical resistance characteristics of the tantalum capacitor may be decreased.

While exemplary embodiments have been shown and described above, it will be apparent to those skilled in the art that modifications and variations could be made without departing from the scope of the invention as defined by the appended claims.

What is claimed is:

1. A tantalum capacitor comprising:
    a capacitor body including a tantalum powder and first and second tantalum wires exposed in opposite first and second directions, such that the first and second tantalum wires are the only tantalum wires exposed in the first and second directions, respectively;
    a molded part enclosing the capacitor body and formed to allow end portions of the first and second tantalum wires to be exposed through two surfaces thereof opposing each other;
    first and second positive electrode terminals extended from the two surfaces of the molded part opposing each other to portions of a bottom surface of the molded part, disposed to be spaced apart from each other, and connected to the first and second tantalum wires, respectively;

a negative electrode terminal disposed between the first and second positive electrode terminals on the bottom surface of the molded part and connected to the capacitor body; and an electrical connection unit disposed between the capacitor body and the negative electrode terminal, wherein the first and second tantalum wires are disposed in positions not coinciding with each other in a width direction of the capacitor body.

2. The tantalum capacitor of claim 1, wherein the first and second tantalum wires are respectively exposed through both end surfaces of the capacitor body in a length direction.

3. The tantalum capacitor of claim 2, wherein the first and second tantalum wires are collinearly disposed in the length direction of the capacitor body.

4. The tantalum capacitor of claim 1, wherein the electrical connection unit is disposed within the molded part between the capacitor body and the negative electrode terminal and is provided as a plurality of via electrodes having both ends connected to a bottom surface of the capacitor body and a top surface of the negative electrode terminal.

5. The tantalum capacitor of claim 1, wherein the electrical connection unit is a pad electrode disposed between the capacitor body and the negative electrode terminal.

6. A tantalum capacitor comprising:

first and second capacitor bodies including a tantalum powder and one surfaces disposed to face each other;

first and second tantalum wires respectively having insertion regions disposed within the first and second capacitor bodies and non-insertion regions exposed through surfaces of the first and second capacitor bodies, opposing each other;

a molded part enclosing the first and second capacitor bodies and formed to allow end portions of the first and second tantalum wires to be exposed through two surfaces thereof opposing each other;

first and second positive electrode terminals extended from the two surfaces of the molded part opposing each other to portions of a bottom surface of the molded part, disposed to be spaced apart from each other, and connected to the first and second tantalum wires, respectively;

a negative electrode terminal disposed between the first and second positive electrode terminals on the bottom surface of the molded part; and an electrical connection unit disposed between the first and second capacitor bodies and the negative electrode terminal and simultaneously connecting the first and second capacitor bodies and the negative electrode terminal to each other.

7. The tantalum capacitor of claim 6, wherein the first and second tantalum wires are respectively exposed through end surfaces of the first and second capacitor bodies opposing each other in a length direction.

8. The tantalum capacitor of claim 7, wherein the first and second tantalum wires are collinearly disposed in a length direction of the molded part.

9. The tantalum capacitor of claim 7, wherein the first and second tantalum wires are disposed in positions offset from each other in a width direction of the molded part.

10. The tantalum capacitor of claim 6, wherein the electrical connection unit is disposed within the molded part between the first and second capacitor bodies and the negative electrode terminal and is provided as a plurality of first via electrodes having both ends connected to a bottom surface of the first capacitor body and a top surface of the negative electrode terminal and a plurality of second via electrodes having both ends connected to a bottom surface of the second capacitor body and the top surface of the negative electrode terminal.

11. The tantalum capacitor of claim 6, wherein the electrical connection unit is a pad electrode disposed between the first and second capacitor bodies and the negative electrode terminal and simultaneously connecting the first and second capacitor bodies and the negative electrode terminal to each other.

12. The tantalum capacitor of claim 6, wherein the first and second capacitor bodies implement the same level of capacity.

13. The tantalum capacitor of claim 6, wherein the first and second capacitor bodies implement different levels of capacity.

* * * * *